United States Patent [19]
Roos et al.

[11] B 3,981,058
[45] Sept. 21, 1976

[54] CUTTING INSERT AND CUTTING TOOL

[75] Inventors: Axel Sven Olof Roos; Kurt Heinrich Albert Erich Faber; Sven Axel Olof Wirfelt, all of Sandviken, Sweden

[73] Assignee: Sandvik Aktiebolag, Sandviken, Sweden

[22] Filed: Feb. 4, 1975

[21] Appl. No.: 546,911

[44] Published under the second Trial Voluntary Protest Program on January 13, 1976 as document No. B 546,911.

[30] Foreign Application Priority Data
Feb. 8, 1974   Sweden............................ 74016791

[52] U.S. Cl....................................... 29/96; 29/95 R
[51] Int. Cl.²............................................. B26D 1/00
[58] Field of Search................... 29/95 R, 96, 105 A

[56] References Cited
UNITED STATES PATENTS

| | | | |
|---|---|---|---|
| 3,124,864 | 3/1964 | Frommelt et al. | 29/96 |
| 3,156,031 | 11/1964 | Lundgren | 29/96 |
| 3,220,088 | 11/1965 | Brundin et al. | 29/96 |
| 3,611,525 | 10/1971 | Cochran | 29/95 |
| 3,754,309 | 8/1973 | Jones et al. | 29/96 |
| 3,775,818 | 12/1973 | Sirola | 29/96 |

FOREIGN PATENTS OR APPLICATIONS 2,213,741   3/1972   Germany............................... 29/96

*Primary Examiner*—Harrison L. Hinson
*Attorney, Agent, or Firm*—Pierce, Scheffler & Parker

[57] ABSTRACT

The invention concerns a cutting insert adapted for a cutting tool having mechanical insert-replacing mechanism. The insert has angularly interrelated side surfaces,- for resting in a corresponding V-shaped pocket in the cutting tool, said side surfaces extending parallel to the main cutting edge of the insert.

9 Claims, 5 Drawing Figures

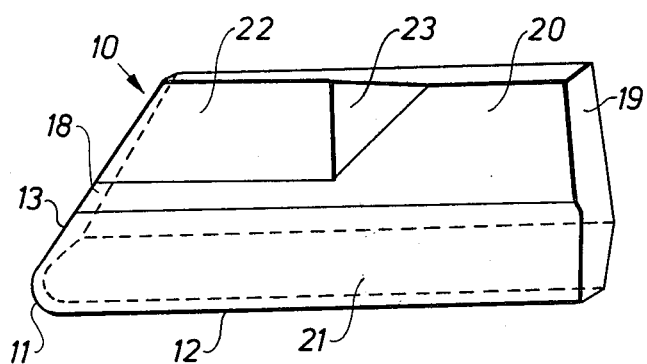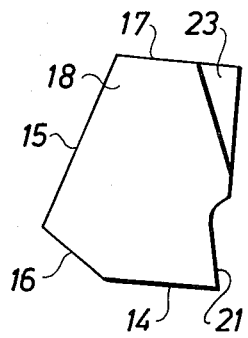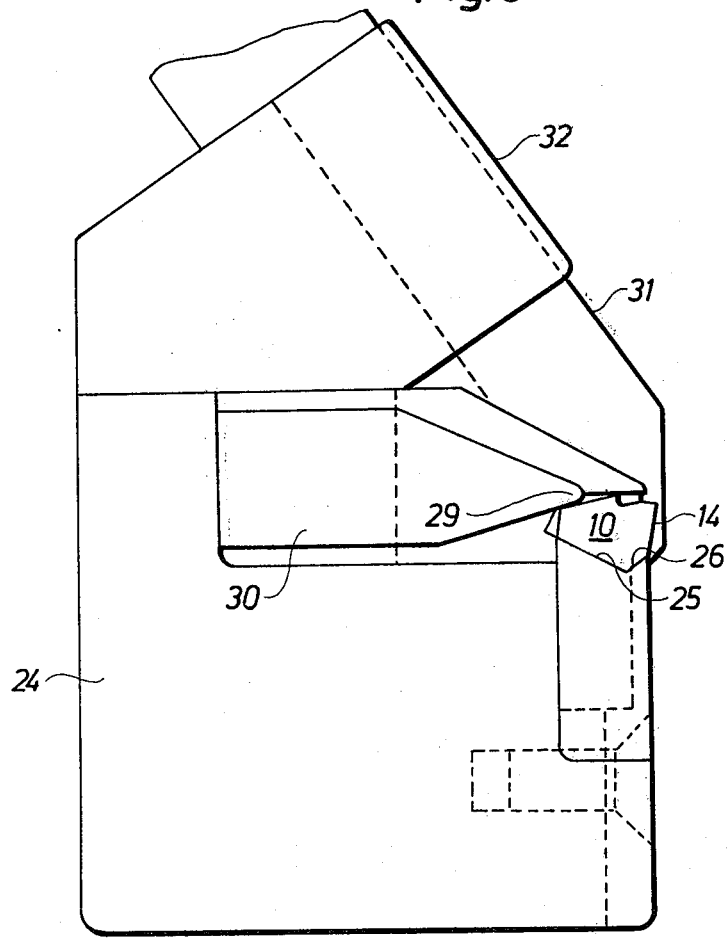

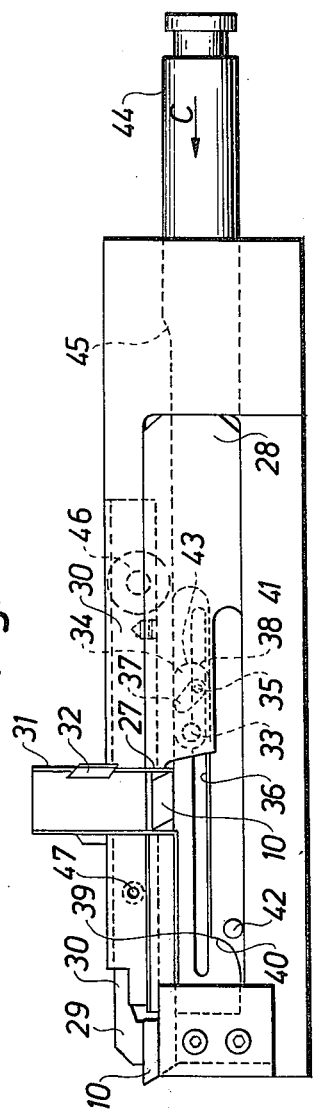
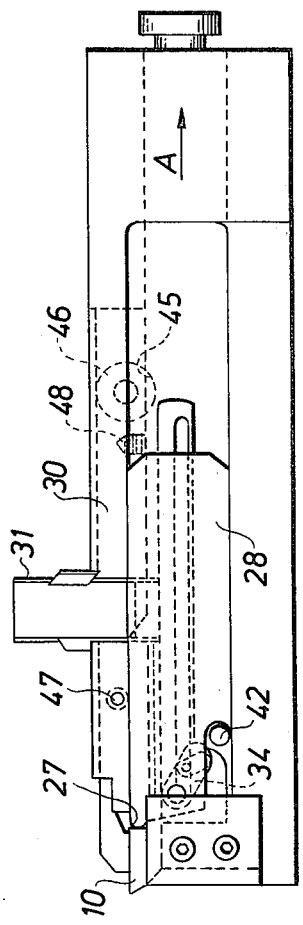

CUTTING INSERT AND CUTTING TOOL

The present invention relates to a cutting insert and to a cutting tool for chip cutting operations. The cutting insert is especially adapted for a cutting tool having mechanical insert-replacing means. The cutting insert has a main cutting edge for co-operation with an adjacent secondary cutting edge and a curved cutting tip portion between said cutting edges, the insert comprising a plurality of side surfaces extending parallel to the main cutting edge two of which being angularly interrelated and constituting bottom supporting surfaces.

In the formation of cutting inserts and of corresponding insert-receiving sites in cutting tools it is always very difficult, due to space problems, to provide clamping elements of such dimensions that adequate clamping forces might be applied to the insert. It is of utmost importance to give the insert and its corresponding site a formation such that the insert is safely pressed against its side supports by means of the cutting forces arising in the use of the tool without need of any large-dimensioned clamping means.

It is an object of the present invention, therefore, to provide a cutting insert and cutting tool, substantially for copying operations, especially configured from such aspects of cutting forces during cutting work, the insert and site being so configured that the insert may be pressed into its corresponding site and kept there mainly by means of the cutting forces arising during use. To this end the insert is provided with angularly interrelated side surfaces adapted to rest in a corresponding V-shaped pocket in a cutting tool, said pair of side surfaces extending parallel to the main cutting edge of said insert. Due to such configuration of the insert and other suitable formation thereof it is possible to effect a wholly mechanical replacement of such insert in its holder. In order, also, that the insert be safely secured in its site even when no cutting forces are acting thereon, and also in cases when the insert has a very small cutting tip radius, or when the cutting tip is damaged, a bevel surface is provided on the top side of the insert for clamping purposes.

The invention will now be described in detail with reference to the accompanying drawings, additional characteristic features of the invention being made apparent in connection therewith.

In the drawings:

FIG. 1 is an elevational view of one embodiment of the cutting insert of the invention;

FIG. 2 is an end view of the insert shown in FIG. 1;

FIG. 3 is an end view of a tool holder provided with an indexing mechanism so as to enable mechanical indexing of the insert shown in FIGS. 1 and 2;

FIG. 4 is a side view of the cutting tool shown in FIG. 3; and

FIG. 5 is a side view of the cutting tool as shown in FIG. 4 but with the indexing mechanism in another position.

Referring to FIGS. 1 and 2, a cutting insert indicated generally by the numeral 10 and mainly configured as a polyhedron has a main cutting edge 12 and a secondary cutting edge 13, the insert 10 having a curved cutting tip portion 11 between said cutting edges 12 and 13. About its circumference insert 10 has several edge surfaces extending parallel to the main cutting edge 12, the lines of intersection of which surfaces are rectilinear and mutually parrallel. One of these edge surfaces is designated 14 and constitutes the clearance face of the main cutting edge 12. Two other edge surfaces are designated 15 and 16 and are intended as bottom supporting surfaces when clamping the insert in its site in a tool holder. The edge surface 15 has the largest surface area of all the edge surfaces and is intended to resist the major cutting forces, whereas edge surface 16 can be characterized as a bottom locating surface. One edge surface 17 located adjacent edge surface 15 is parallel to clearance face 14.

The angle between surfaces 15 and 16 is 90° – 130°. In the preferred embodiment shown in the drawings said angle amouns to a value within the preferred narrower range of 100° – 120°. Further, with the insert seen in end view, as shown in FIG. 2, the said surfaces 15 and 16 have an angular interrelation such that a normal drawn to the intersection line therebetween passes through the clearance face 14 of the main cutting edge 12. At the same time the angle between said clearance face 14 and edge surface 15 amounts to a value within the range 55° – 85°. Due to this mode of insert configuration it is achieved that the cutting force resultant, when chip cutting occurs in the plane of FIG. 3, is not able to cause any displacement of the insert from its site in the tool holder and this is so even if the frictional relationship between the insert and the support surfaces of the site is taken into full consideration.

Cutting insert 10 is longitudinally restricted by two opposite end surfaces 18 and 19. One end surface 18 constitutes the clearance face of the secondary cutting edge 13, whereas the other end surface 19 is intended to take the thrust of a side abutment in the tool holder. The end surface 18 and the clearance face 14 are so angularly interrelated that the main cutting edge 12 and the secondary cutting edge 13 extend towards the cutting tip 11 at an angle therebetween amounting to a value below 60°. Preferably, said opposite end surfaces 18 and 19 extend in planes which intersect along an intersection line that is parallel with the plane extending through the main cutting edge 12 and its clearance face 14.

The surface 20 located opposite edge surface 15 extends parallel with surfaces 15 and 16 and constitutes the top side of the insert, a form-sintered chipbreaker 21 being provided thereon extending along the main cutting edge 12 and the secondary cutting edge 13. Further, the top side 20 of the insert is provided with a depressed plane surface 22 extending parallel with the main cutting edge 12, said surface 22 intersecting with adjacent surfaces 17 and 20 (see FIG. 2) at angles of more than 90°. The transition between top surface 20 and depressed surface 22 is constituted by a bevel surface 23 obliquely disposed in the longitudinal direction of the insert and adapted to receive a suitable clamping element. Due to the above-described configuration, the bevel surface 23 is given a triangular form. Preferably, said surface 23 is located centrally on the top side of the insert and intersects with depressed surface 22 at an angle of 10° – 30°. With such insert configuration and such clamping arrangement, i.e. providing a bevel surface 23 to receive a clamping element, indicated 29 in FIG. 3, on the top side of the insert, there is eliminated any tendency for the insert to come apart from its site even when subjected to loads during a copying operation which usually tends to extract the insert from its site. Further, the described insert configuration enables mechanical insert replacement, plane surfaces 20 and 22 then acting as sliding surfaces for clamping element 29 which is to act against bevel surface 23 when the insert is in cutting engagement.

FIGS. 3 to 5 show one form of a tool holder 24 having a site at one of its ends for the reception of a cutting insert 10 made in accordance with the present invention. The site comprises two support surfaces 25 and 26 for the receipt of the correspondingly shaped edge surfaces 15 and 16 of the insert, said surfaces 25 and 26 thus being mutually parallel and intersecting at an angle in the range 90° – 130°, preferably 100° – 120°. Further, said site comprises a side support 27 for abutment against end surface 19 of the insert, invisible in FIG. 3. This side support 27, which may be formed as a support point or support surface, is formed as a protrusion on the end surface of a member 28, said member being axially displaceable in the tool holder 24 and forming part of the insert-replacing apparatus. The edge surface 17 of the insert which is parallel to the clearance face 14 is not arranged to abut against any side support.

Insert 10 is held down by a clamping plate 29 which is urgable against bevel surface 23. Clamping plate 29 may be fastened to, or integral with, a movable arm 30 which co-operates with member 28 in insert replacement and clamping. Member 28 is movable in the longitudinal direction of the insert and provides a firm side support to the insert in the position shown in FIG. 5.

Support surfaces 25 and 26 of the insert- receiving site are formed in such a manner that, with the insert clamped in position thereagainst, the main cutting edge 12 and the secondary cutting edge 13 are laid bare in their entirety with respect to the holder, there being presented a requisite clearance angle at both said cutting edges 12 and 13. Although not restricting the invention thereto, the angle of inclination of said support surfaces preferably is selected so that there is presented a clearance angle of approximately 6° at both said cutting edges.

FIGS. 4–5 show an automatic insert-replacing mechanism of the cutting tool in greater detail. Referring to FIG. 4, the movable member 28, formed as a plate, is shown in a position where its protrusion 27 is placed behind a cutting insert 10, which is exposed from a magazine 31, a spring being provided in the upper end portion of said magazine 31 to press the inserts outwardly, i.e. downwardly as seen in FIGS. 4 and 5. The magazine 31 is suitably fastened to the holder 24 by clasping means 32.

Member 28 is axially displaceable in the direction C by means of a bar 44 and a pin 35 thereon, said pin 35 engaging in a slot 37 in an element 34 pivoted on the member 28 at 33. Element 34 rests on a surface 36 and slides along this surface without pivoted movement, although the pin 35 is acting against one side wall of the slot 37. The member 28 thus continues its forward movement until a corner 38 on the element 34 has passed a corner 39 of a support surface 40 in the holder. Immediately thereupon an abutment surface 41 provided on the member 28 makes contact with a fixed pin 42. Due to the action of the pin 35 against the slot 37 the element 34 is turned until a support surface 43 thereon is brought into engagement with the corresponding support surface 40 in the holder. The support surface 43 is cylindrically shaped with its axis situated at some distance above the middle point of the pivot 33 thus accomplishing a wedging action between the surfaces 40 and 43 so as to effectively lock the member 28 in its foremost position while making the element 34 self-locking against forces acting upon the member 28 via its protrusion 27. Due to this arrangement, all backlash between the different movable elements is eliminated and the insert 10 receives solid support against cutting forces acting thereon, which is of utmost importance for the dimensional accuracy attainable on those work pieces with which the insert is intended to engage during cutting operations.

When element 34 has been turned and locking is obtained in the above-mentioned manner, the forward movement of the pin 35 is terminated. Pin 35 is attached to bar 44 through a spring-loaded lost motion attachment, so that when the bar continues its forward movement the pin 35 will press upon one side wall in the slot 37 with increased spring action while a cam surface 45 on the bar 44 is brought into contact with a rotatable wheel 46 which is pivoted on the movable arm 30, which latter is pivotable around a pin 47 and spring-biased via a spring 48. The wheel 46 thus moves upwardly along the surface 45 and this results in a downward movement of the clamping plate 29 on the arm 30, thus accomplishing clamping of the insert 10 against bottom surfaces 25 and 26 and side support 27 in its site.

During its feed forwardly the insert 10 is steered in a longitudinal recess in the holder which is so configured that the insert is obliquely disposed therein during the feed, said obliqueness corresponding to that of the bottom supporting surface 26 of the site in the holder 24. During the feed movement of the insert the movable arm 30 is slightly spring-biased from spring 48, and clamping plate 29 only acts upon insert 10 with a small pressure so as to facilitate the old insert being pushed out by the new insert thus brought forward to it. When the bar 44 is brought backwardly the wheel 46 falls again while following the cam surface 45, thus relieving the pressure acting upon the insert 10 in its site. Pin 35 will then act against the opposite wall of slot 37, thus turning element 34 so that surface 43 on the same will leave the corner 39 and thus be brought out of engagement with surface 40. Member 28 as well as the accompanying element 34 may then freely be axially displaced in the direction A.

We claim:

1. A tool holder and cutting insert combination consisting of a tool holder (24) and a cutting insert (10), said insert having a main cutting edge (12) and a secondary cutting edge (13) with a curved cutting tip portion (11) therebetween, the insert having around its circumference several edge surfaces extending parallel to the main cutting edge two of which edge surfaces, (15) and (16), being angularly interrelated and constituting bottom supporting surfaces, said surfaces forming an angle of 90° – 130°, preferably 100° – 120°, with each other, a third said edge surface constituting a clearance face for the main cutting edge, the insert having two opposite end surfaces, (18) and (19), one of which constituting the clearance face of the secondary cutting edge and the other constituting an end abutment surface, the top surface (20) being located opposite said angularly related edge surfaces (15, 16) and being provided with a bevel surface (23), said holder having an insert site at one of its ends, said insert site having bottom supporting surfaces (25, 26), angularly related at an angle of 90° – 130°, preferably 100° – 120°, and a side support, provided on an axially displaceable means in the holder, engaged by said angularly relates edge surfaces and said end abutment surface respectively of said cutting insert positioned therein, a movable clamping plate (29) being arranged for the clamping of the insert in said site, a movable arm (30) being secured to said clamping plate, said clamping plate being positioned over said insert and engageable with the bevel surface (23) thereof for pressing the insert against said bottom surfaces (25, 26) upon actuation of said arm by said axially displaceable means in the holder.

2. A cutting tool as defined in claim 1, wherein the main cutting edge (12) as well as the secondary cutting edge (13) are laid bare in their entirety with respect to the holder (24), there being presented a clearance angle at both said edges.

3. A cutting insert for chip cutting operations having a main cutting edge (12) and a secondary cutting edge (13) with a curved cutting tip portion (11) therebetween, the insert having around its circumference several edge surfaces extending parallel to the main cutting edge two of which edge surfaces, (15) and (16), being angularly interrelated and constituting bottom supporting surfaces, said surfaces forming an angle of 90° – 130°, preferably 100° – 120°, with each other, a third said edge surface constituting a clearance face for the main cutting edge, the insert having two opposite end surfaces, (18) and (19), one of which constituting the clearance face of the secondary cutting edge and the other constituting an end abutment surface, the top surface (20) being located opposite said angularly related edge surfaces and being provided with a bevel surface (23) adapted to receive a clamping element.

4. A cutting insert as defined in claim 3, wherein the bevel surface (23) is located at the middle of the top surface (20) and is associated with a depressed plane surface (22) thereon, both said surfaces (20) and (22) extending parallel to the main cutting edge (12).

5. A cutting insert as defined in claim 3, wherein the bevel surface (23) is triangular in shape and is obliquely disposed to intersect with depressed surface (22) at an angle of 10° – 30°.

6. A cutting insert as defined in claim 3, wherein said opposite end surfaces (18) and (19) extend in planes which are acute-angled.

7. A cutting insert as defined in claim 6, wherein said opposite end surfaces (18) and (19) extend in planes which intersect along an intersection line which is parallel to the plane extending through the clearance face (14) of the main cutting edge (12).

8. A cutting insert as defined in claim 3, wherein the main cutting edge (12) and the secondary cutting edge (13) extend towards the cutting tip at an angle therebetween that amounts to a value below 60°.

9. A cutting insert as defined in claim 3, wherein edge surfaces (15) and (16), with the insert seen in end view, are so disposed that a normal drawn to the line of intersection therebetween passes through the clearance face (14) of the main cutting edge while surfaces (14) and (15) being acute-angled at an angle of 55° – 85°.

* * * * *